United States Patent
Rychev et al.

(10) Patent No.: US 11,829,412 B2
(45) Date of Patent: Nov. 28, 2023

(54) METHODS, SYSTEMS, AND MEDIA FOR DETERMINING A COVERAGE SCORE FOR A SYSTEM THAT RECEIVES A STREAM OF REQUESTS

(71) Applicant: Google LLC, Mountain View, CA (US)

(72) Inventors: Vladimir Rychev, Zurich (CH); Cristi Varvara, Zurich (CH)

(73) Assignee: Google LLC, Mountain View, CA (US)

( * ) Notice: Subject to any disclaimer, the term of this patent is extended or adjusted under 35 U.S.C. 154(b) by 168 days.

(21) Appl. No.: 17/554,655

(22) Filed: Dec. 17, 2021

(65) Prior Publication Data
US 2023/0195784 A1 Jun. 22, 2023

(51) Int. Cl.
*G06F 16/00* (2019.01)
*G06F 16/73* (2019.01)
*G06V 10/94* (2022.01)
*G06V 20/40* (2022.01)

(52) U.S. Cl.
CPC .............. *G06F 16/73* (2019.01); *G06V 10/95* (2022.01); *G06V 20/41* (2022.01)

(58) Field of Classification Search
CPC ......... G06F 16/73; G06F 16/75; G06V 10/95; G06V 20/41
See application file for complete search history.

(56) References Cited

U.S. PATENT DOCUMENTS

| | | |
|---|---|---|
| 9,681,158 B1 | 6/2017 | Gargi et al. |
| 11,089,076 B1 | 8/2021 | Thario |
| 2015/0169587 A1 | 6/2015 | Silverman et al. |
| 2017/0048297 A1 | 2/2017 | Funge et al. |
| 2017/0289589 A1 | 10/2017 | Koumchatzky et al. |

*Primary Examiner* — Jared M Bibbee
(74) *Attorney, Agent, or Firm* — Shumaker & Sieffert, P.A.

(57) ABSTRACT

Methods, systems, and media for determining a coverage score for a system that receives a stream of requests are provided. In some embodiments, the method includes: for a processing system that receives a stream of requests, determining a first time window in which requests are received by the processing system, wherein the first time window has a start time and an end time and wherein each of the requests is associated with a timestamp; determining a first number of requests that entered the processing system after the start time of the first time window; determining a second number of requests that entered the processing system within the first time window and that were successfully completed within a second time window from the timestamp associated with each of the requests; determining a coverage score that is a ratio of the second number of requests in comparison with the first number of requests; and generating a notification for a user of the processing system based on the coverage score.

21 Claims, 5 Drawing Sheets

METHODS, SYSTEMS, AND MEDIA FOR DETERMINING A COVERAGE SCORE FOR A SYSTEM THAT RECEIVES A STREAM OF REQUESTS

TECHNICAL FIELD

The disclosed subject matter relates to methods, systems, and media for determining a coverage score for a system that receives a stream of requests. More particularly, the disclosed subject matter relates to determining a coverage score that reflects the latency and availability of a system that receives and processes requests that may not have an expected response time and providing a notification concerning the system based on the coverage score.

BACKGROUND

In a real-time service, such as a search engine, a user submits a search query to the service and expects to receive search results that are responsive to the search query within a few seconds. If the search engine cannot respond to the search query within a certain amount of time, the search engine often abandons the query and notes the request as a failed instance. Such failure events contribute to measurements of reliability. By measuring reliability, a service operator can describe the user-perceived performance of the real-time service. Two common metrics that describe the state of the system are (1) service availability that can be defined as the percentage of time that the service is available and (2) latency that can be defined as the amount of time that a user can expect to wait before the service fulfills or otherwise successfully responds to a request.

It should be noted that instead of optimizing for a quick response to real-time requests, some services seek to process all requests with no cutoff time to abandon requests. In such a service, processing each and every request eventually can be more important than completing the request quickly. As a result, this service can process some requests in a short period of time (e.g., minutes), while other, more complex requests may take a longer period of time (e.g., hours or even days) to process. Service availability and latency measurements, however, do not capture the behavior of this type of service. As such, it can be difficult for service providers to describe the reliability of the service to their users.

Accordingly, it is desirable to provide new methods for determining a coverage score for a system that receives a stream of requests.

SUMMARY

Methods, systems, and media for processing a system that receives a stream of requests are provided.

In accordance with some embodiments of the disclosed subject matter, a method for determining system reliability is provided, the method comprising: for a processing system that receives a stream of requests, determining, using a hardware processor, a first time window in which requests are received by the processing system, wherein the first time window has a start time and an end time and wherein each of the requests is associated with a timestamp; determining, using the hardware processor, a first number of requests that entered the processing system after the start time of the first time window; determining, using the hardware processor, a second number of requests that entered the processing system within the first time window and that were successfully completed within a second time window from the timestamp associated with each of the requests; determining, using the hardware processor, a coverage score that is a ratio of the second number of requests in comparison with the first number of requests; and generating, using the hardware processor, a notification for a user of the processing system based on the coverage score.

In some embodiments, the method further comprises determining a category of requests within the processing system, wherein the requests in the first number of requests are within the category of requests that entered the processing system after the start time of the first time window and wherein the requests in the second number of requests are within the category of requests that entered the processing system within the first time window and that were successfully completed within the second time window from the timestamp.

In some embodiments, the processing system comprises monitoring video content for compliance with a content policy.

In some embodiments, the stream of requests comprises at least one request to detect features within video content. In some embodiments, the stream of requests comprises at least one request to generate classification labels for video content.

In some embodiments, generating the notification for the user of the processing system based on the coverage score comprises: determining a threshold with at least one of a lower bound and an upper bound; determining that the coverage score is outside of the threshold; and generating a message comprising at least one of the coverage score and the threshold.

In some embodiments, the notification includes a previously determined coverage score.

In accordance with some embodiments of the disclosed subject matter, a system for determining system reliability is provided, the system comprising a memory and a hardware processor that is coupled to the memory and that is configured to: for a processing system that receives a stream of requests, determine a first time window in which requests are received by the processing system, wherein the first time window has a start time and an end time and wherein each of the requests is associated with a timestamp; determine a first number of requests that entered the processing system after the start time of the first time window; determine a second number of requests that entered the processing system within the first time window and that were successfully completed within a second time window from the timestamp associated with each of the requests; determine a coverage score that is a ratio of the second number of requests in comparison with the first number of requests; and generate a notification for a user of the processing system based on the coverage score.

In accordance with some embodiments of the disclosed subject matter, a non-transitory computer-readable medium containing computer executable instructions that, when executed by a processor, cause the processor to execute a method for determining system reliability is provided, the method comprising: for a processing system that receives a stream of requests, determining a first time window in which requests are received by the processing system, wherein the first time window has a start time and an end time and wherein each of the requests is associated with a timestamp; determining a first number of requests that entered the processing system after the start time of the first time window; determining a second number of requests that entered the processing system within the first time window and that were successfully completed within a second time window from the timestamp associated with each of the requests; determining a coverage score that is a ratio of the second number of requests in comparison with the first number of requests; and generating a notification for a user of the processing system based on the coverage score.

In accordance with some embodiments of the disclosed subject matter, a system for determining system reliability is provided, the system comprising: for a processing system that receives a stream of requests, means for determining a first time window in which requests are received by the processing system, wherein the first time window has a start time and an end time and wherein each of the requests is associated with a timestamp; means for determining a first number of requests that entered the processing system after the start time of the first time window; means for determining a second number of requests that entered the processing system within the first time window and that were successfully completed within a second time window from the timestamp associated with each of the requests; means for determining a coverage score that is a ratio of the second number of requests in comparison with the first number of requests; and means for generating a notification for a user of the processing system based on the coverage score.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
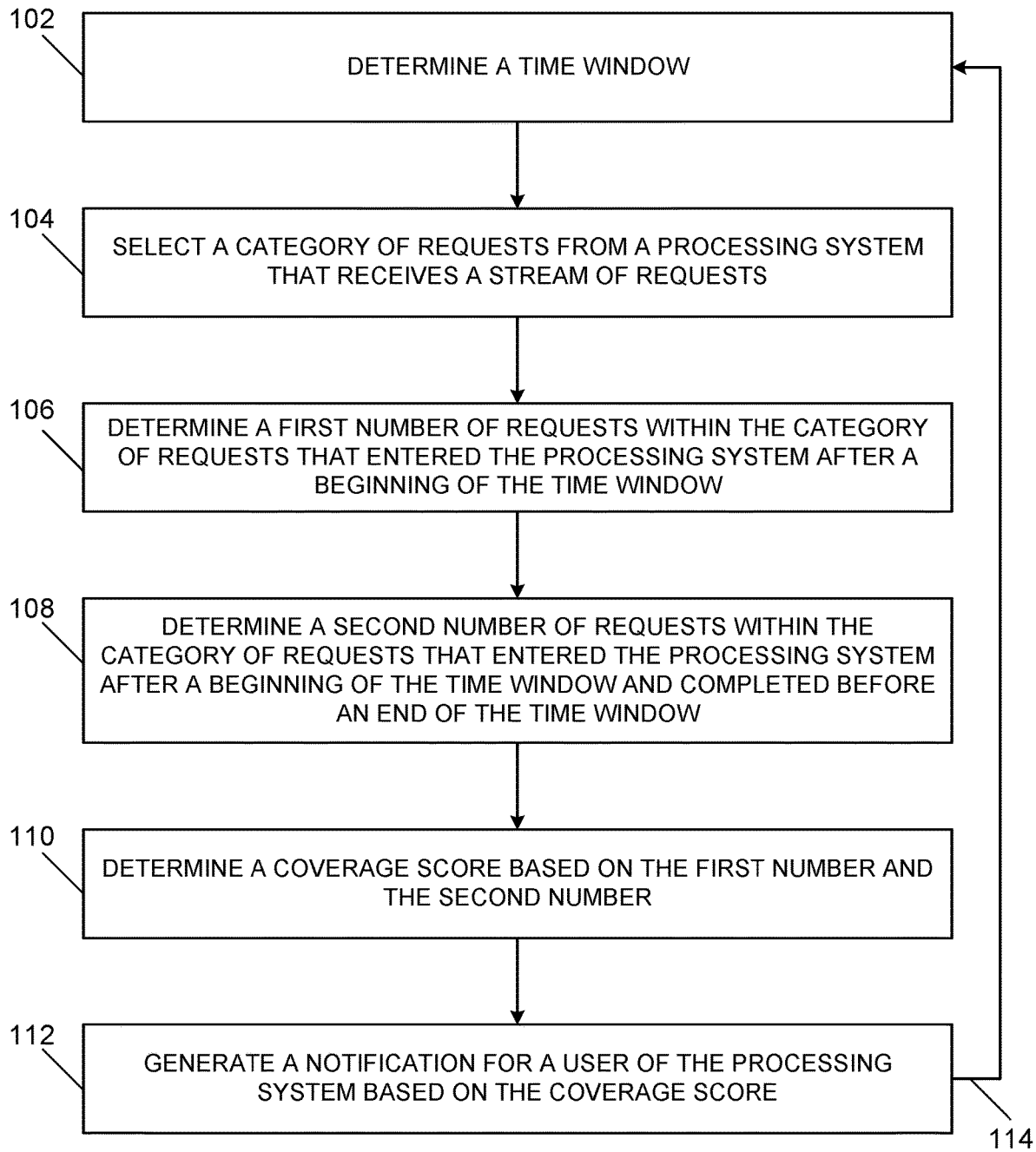
FIG. 1 shows an example of a process for determining a coverage score for a processing system that receives a stream of requests in accordance with some embodiments of the disclosed subject matter.

In accordance with various embodiments, mechanisms (which can include methods, systems, and media) for determining a coverage score for a system that receives a stream of requests are provided.

In some embodiments, the mechanisms described herein can determine a coverage score for a processing system that is based on the number of requests completed by the processing system within a certain time window. As used herein, coverage can be generally defined as a proportion of valid data that has been processed successfully by a processing system. A coverage score can be a metric that reflects the latency and the availability of the processing system. For example, for a particular time window, coverage on the particular time window can be defined as the ratio of successfully processed units started in that time window and successfully completed or otherwise finished within that time window divided by the total units started in that time window. In another example, for requests received within a first time window, coverage at a second time window can be defined as the ratio of successfully processed units within the second time window from a timestamp of a request (e.g., an upload timestamp) divided by the total number of requests received within the first time window. In turn, the mechanisms can alert users of the processing system to changes in the state of the system based on the coverage score (e.g., a health indication that the processing system has processed less than a threshold percentage of requests, a state indication that a first coverage score indicates that the processing system successfully processed less than a threshold percentage of requests but that a second coverage score indicates that the processing system has recovered to successfully process a number of requests greater than the threshold number of requests at a later time).

In some embodiments, the mechanisms can select a duration of time to measure the processing system. For example, in some embodiments, the mechanisms can use a sliding 15 minute time window, where the start of the 15 minute window is adjusted at each iteration of the mechanisms. In some embodiments, the mechanisms can determine how many requests were generated in the selected time window. In some embodiments, the mechanisms can additionally determine how many of the generated requests were also successfully completed during the selected time window. In a more particular example, the mechanisms can determine the number of requests that arrived within a first time window (e.g., requests between 9:00 AM and 9:01 AM) and then determine at a second time window which fraction of the requests that arrived within the first time window were successfully completed or otherwise succeeded within the second time window (e.g., 2 minutes) from their request timestamp (e.g., an upload timestamp for a video that was uploaded to a content service). In this example, the first time window can be the time window over which the mechanisms determine the incoming requests to the processing system and the second time window can be the amount of time given for the requests to successfully complete (e.g., the time to perform a video classification from the upload of that video).

In some embodiments, the mechanisms can determine a state of the processing system by determining requests covered in the selected time window. In some embodiments, the coverage score can be the ratio of completed requests within an amount of time from the time the request was received to the number of requests that were received within a time window. In some embodiments, the mechanisms can generate a report, a notification, and/or any other suitable message containing the coverage score. In some embodiments, the mechanisms can operate as a background measurement to report on the processing system to the users and/or operators of the processing system.

These mechanisms can be used in a variety of applications. For example, in some embodiments, the mechanisms can be used to measure any suitable processing system which handles an incoming real time stream of requests. In some embodiments, the mechanisms can be used with processing systems that have at least the following characteristics: (a) a processing system that processes incoming requests in a "sooner the better" approach, (b) a processing system that does not have a short response deadline (e.g., a timeout), and/or (c) a processing system that seeks to process as many requests as possible, allowing hours, days, etc., to process some requests. In a more particular example, a processing system that uses machine learning and/or any other suitable classifier to classify content (e.g., audio clips, videos, social media posts) can use the mechanisms described herein to determine the health of the system and to help identify problems within the automated classification system. In another more particular example, the mechanisms can be applied to determine the state of a system of workers who manually respond or fulfill user requests (e.g., visa applications, citizenship requests, adoption requests, etc.).

It should be noted that the mechanisms can be used based on any suitable criteria. For example, in some embodiments, the mechanisms can be used based on a volume of requests received by the processing system in a particular time period. In another embodiment, the mechanisms can be used based on a determination that incoming requests are taking longer than a threshold amount of time to process. In another embodiment, the mechanisms can be used based on a time of day, day of the week, and/or any other suitable daily, monthly, and/or yearly condition.

These and other features for determining a coverage score for a system that receives a stream of requests are further described in connection with FIGS. 1-4.

Turning to FIG. 1, an illustrative example of a process 100 for determining a coverage score for a processing system that receives a stream of requests in accordance with some embodiments is shown. In some embodiments, process 100 can be executed by any suitable hardware, such as server 302 or user devices 308 and 310, as discussed in connection with FIG. 3 below.

In some embodiments, process 100 can begin at block 102, where process 100 can determine a time window having a start time and an end time for analyzing the performance of the processing system. For example, in some embodiments, process 100 can set the time window to be 15 minutes, starting at the current time and/or starting at any other time prior to the current time. The time window determined at block 102 can be any suitable length of time (e.g., 1 minute, 1 hour, 1 day) in some embodiments. Process 100 can, in some embodiments, determine the time window using any suitable time and/or date format (e.g., 12-hour time, 24-hour time, month/day/hour, hour/min/sec, etc.).

In some embodiments, the time window can be received from a user, such as an administrative user, of the processing system. For example, an administrative user of the processor system can select a particular time window (e.g., thirty minutes) and, in response, the administrative user can receive a coverage score for that particular time window and other performance data corresponding to the processing system during that time window.

In some embodiments, the time window can be selected based on the incoming stream of requests. For example, a shorter time window (e.g., 15 minutes from the publication time of a video) can be selected for a classifier that detects objectionable content in videos in order to reduce viewer harm from watching a video that contains a particular type or a particular amount of objectionable content.

In some embodiments, the time window can be selected based on a volume of the incoming stream of requests. For example, in response to determining that a low volume of requests is being received, process 100 can increase the time window for analyzing the performance of the processing system (e.g., from 15 minutes to 1 hour).

In some embodiments, process 100 can determine multiple time windows. For example, process 100 can select a first time window for determining the number of requests that were received within the first time window (e.g., requests received between a time window of 9:00 AM and 9:01 AM). In continuing this example, process 100 can select a second time window for determining the number of those requests that were successfully completed within the second time window (e.g., what fraction of the requests that were received within the first time window were successfully completed or otherwise succeeded within the second time window of two minutes from their request timestamp). In this example, the first time window can be the time window over which process 100 determines the incoming requests to the processing system and the second time window can be the amount of time given for the requests to successfully complete (e.g., the time to perform a video classification from the upload of that video).

In some embodiments, multiple coverage scores at different time windows can be generated for a processing system. For example, for a video classification system that receives multiple classification requests, a coverage score at a smaller time window (e.g., Coverage @ 5 m) can be determined to alert an administrative user or a response team when the classifier breaks down, thereby ensuring that the majority of the received requests are being completed quickly. In continuing this example, a coverage score at a larger time window (e.g., Coverage @ 30 days) can be determined to notify the administrative user or the response team of long-tail regressions, thereby ensuring that the majority of the received requests are eventually completed. In another example, a coverage score at a smaller time window (e.g., Coverage @ 1 hour) can indicate that a processing system had an outage in which videos received between LOAM and 11 AM were not classified (e.g., a coverage score of 0), while a coverage score at a larger time window (e.g., Coverage @ 24 hours) can indicate that the processing system has recovered in which videos received over the last 24 hours had a coverage score greater than a threshold value.

In some embodiments, process 100 can continue to block 104, where process 100 can determine that, for the processing system which handles an incoming real-time stream of requests, the real time stream of requests can be grouped into categories of requests. For example, in some embodiments, the processing system can monitor incoming media content through many sub-tasks (feature generation, subject matter classification, etc.), where each sub-task can result in a series of requests which can be grouped into a category of requests. In some embodiments, at block 104, process 100 can identify a specific sub-task to measure and can select the category of requests associated with that sub-task.

In some embodiments, at block 106, process 100 can determine, in any suitable manner, how many requests entered the processing system from the start of a first time window determined at block 102. For example, in some embodiments, process 100 can determine that 3,047 new requests to classify video uploads were received by a video classification system in a 15-minute window starting at 9:00 am local time and ending at 9:15 am local time.

In some embodiments, at block 108, process 100 can determine how many requests both (a) entered the processing system within the first time window determined at block 102 and (b) completed before the end of the second time window determined at block 102. For example, in some embodiments, process 100 can determine that, in a 15-minute window starting at 9:00 am local time, 3,047 new requests to classify video uploads were received and that of the 3,047 new requests, 2,660 requests were completed (that is, 2,660 videos were classified by the video classification system) within the second time window of two minutes from the time at which the request was received.

It should be noted that any suitable criteria can be used to determine that a request was successfully completed. For example, in a processing system that receives video processing requests or feature generation requests, process 100 can determine that a request was successfully completed if a received video item is determined to be successfully processed by upstream infrastructure and if a first classification score was generated and stored in a particular database within a time, t, of the video publish time. In a more particular example, where Video A is published at time 0, Video A is successfully processed by classification infrastructure, and a first classification score was generated in about 20 minutes after publication and stored within a database of classification scores, Video A can be determined to meet the success criteria for generating a coverage score within a time window of 6 hours (Coverage @ 6 h) but can be determined to not meet the success criteria for generating a coverage score within a time window of 15 minutes (Coverage @ 15 m).

In some embodiments, at block 110, process 100 can determine a coverage score based on the determination made at blocks 106 and at 108. In some embodiments, process 100 can determine the coverage score using any suitable function. For example, for a set of N published videos, coverage at time T (coverage @ T) can be defined as the percentage of those videos for which a particular classifier successfully ran at most T minutes after video publication. In some embodiments, process 100 can determine the coverage score at block 110 using the ratio of the number of requests completed to the number of received requests within a particular time window (e.g., requests that arrived between 9:00 AM and 9:15 AM). That is, in some embodiments, at block 110, process 100 can divide the number of completed requests (e.g., 2,066 successfully completed requests) by the number of received requests (e.g., 3,047 received requests). Continuing with the example above, in some embodiments, process 100 can determine a coverage score of 87.3.

In some embodiments, at block 112, process 100 can generate a notification for a user of the processing system. In some embodiments, process 100 can generate a notification based on the coverage score determined at block 110. In some embodiments, process 100 can determine a threshold and/or an acceptable range for the coverage score. In some embodiments, process 100 can determine at block 110 that the coverage score is above a threshold, below a threshold, and/or outside of an acceptable range. In some embodiments, process 100 can generate an alert containing the coverage score determined at block 110. In some embodiments, process 100 can include coverage scores that were previously determined. In some embodiments, process 100 can generate a text-based message (e.g., an email, a push notification, a pop-up message, etc.), a status report indicating the coverage score is falling within a particular range (e.g., red/yellow/green system health indicator), and/or any other suitable type of notification.

In some embodiments, at 114, process 100 can loop back to block 102. In some embodiments, process 100 can loop at any suitable frequency and/or with any suitable wait time before starting at block 102 again. In some embodiments, process 100 can run any suitable number of iterations, and can, in some embodiments, run continuously and/or for any suitable duration. For example, in some embodiments, process 100 can execute during a period of time where the processing system experiences a particularly high volume of incoming requests.

In some embodiments, process 100 can loop at 114 and can use any suitable time window at block 102 in a subsequent iteration(s). In some embodiments, process 100 can loop at 114 and in a subsequent iteration can use, at block 102, the same time window from a previous iteration. In some embodiments, process 100 can alter the time window in any suitable manner. For example, in some embodiments, process 100 can, at block 102, determine that the time window from a previous iteration can have a different duration (e.g., shorter, longer). In some embodiments, process 100 can use the same starting time while having a different duration (e.g., shorter, longer) of the time window.

In some embodiments, process 100 can alter the time window from a previous iteration to have a different starting time but the same duration of time in the time window. For example, in some embodiments, process 100 can determine, at block 102, that a 15 minute time window can be used to compute a "15 minute" coverage score, with the time window starting at 9:00 am local time and ending at 9:15 am local time. Continuing this example, in some embodiments, a later iteration of process 100 can determine at block 102 that a 20 minute time window can be used to compute at "20 minute" coverage score on the same processing system, with the time window starting at 9:00 am and ending at 9:20 am local time.

It should be understood that at least some of the above-described blocks of the process of FIG. 1 can be executed or performed in any order or sequence not limited to the order and sequence shown in and described in connection with the figure. Also, some of the above blocks of the process of FIG. 1 can be executed or performed substantially simultaneously where appropriate or in parallel to reduce latency and processing times. Additionally or alternatively, some of the above described blocks of the process of FIG. 1 can be omitted.

Figure 2A:
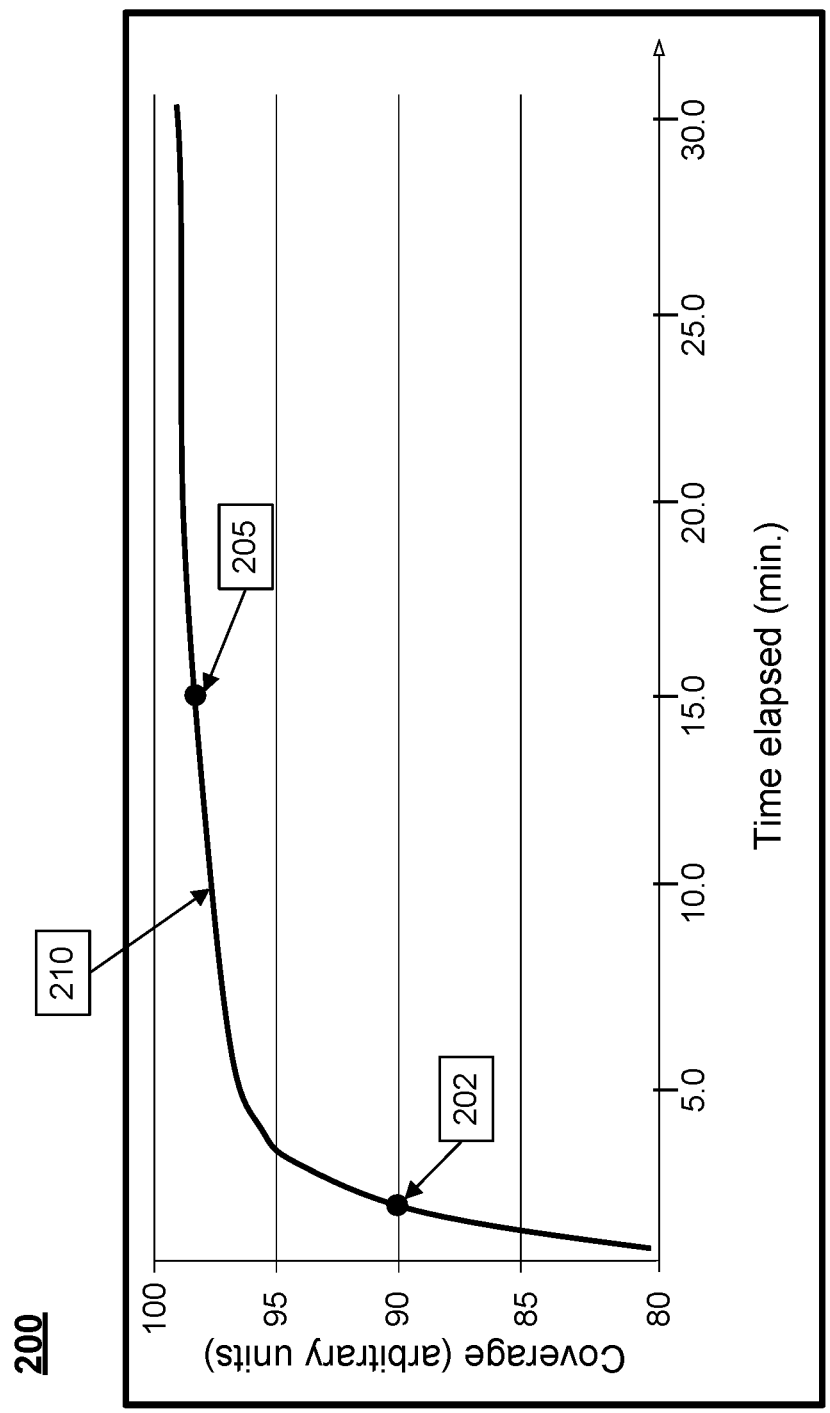
FIGS. 2A and 2B show examples of graphs generated as notifications for a user of the processing system in accordance with some embodiments of the disclosed subject matter.

Turning to FIG. 2A, an illustrative example of a graph 200 that can be generated as a notification for measuring a processing system that receives a stream of requests in accordance with some embodiments is shown. In some embodiments, graph 200 can have an X-axis ("Time Elapsed (min.)") identifying the time window determined by process 100 at block 102, as discussed in connection with FIG. 1 above. In some embodiments, graph 200 can have a Y-axis ("Coverage (arbitrary units)") identifying the scale of coverage scores determined by process 100 at block 110, as discussed in connection with FIG. 1 above.

In some embodiments, graph 200 can be populated with data points that form curve 210. In some embodiments, curve 210 can be generated by process 100 at block 112, as discussed in connection with FIG. 1 above.

In some embodiments, process 100 can use multiple time windows to track coverage of the same processing system at various time intervals, as described above in connection with FIG. 1. In some embodiments, process 100 can use the coverage scores for multiple time windows to generate a notification at block 112, as described in FIG. 1 above, resulting in graph 200 comprising curve 210.

For example, in some embodiments, process 100 can be used to measure requests in a processing system that classifies video content. In this example, data point 202 can correspond to a 2 minute time window. Continuing this particular example, the video content classification system can receive video uploads between 9:00 am and can begin classifying videos at 9:01 AM. At 9:03 AM, process 100 can compute, as the coverage score, the fraction of videos uploaded to the video classification system between 9:00 AM and 9:01 AM for which the video classification system completed classification within 2 minutes of the video upload timestamp. As shown in FIG. 2, in some embodiments, data point 202 can have a coverage score of 90 at the elapsed time of 2 min.

In another example, in some embodiments, data point 205 can correspond to a 15 minute time window. Continuing this particular example, process 100 can compute, as the coverage score, the fraction of videos uploaded to the video classification system between 9:00 am and 9:01 am for which the video classification system completed classification within 15 minutes of the video upload timestamp. As shown in FIG. 2, in some embodiments, data point 205 can have a coverage score of 98 at the elapsed time of 15 min.

Figure 2B:
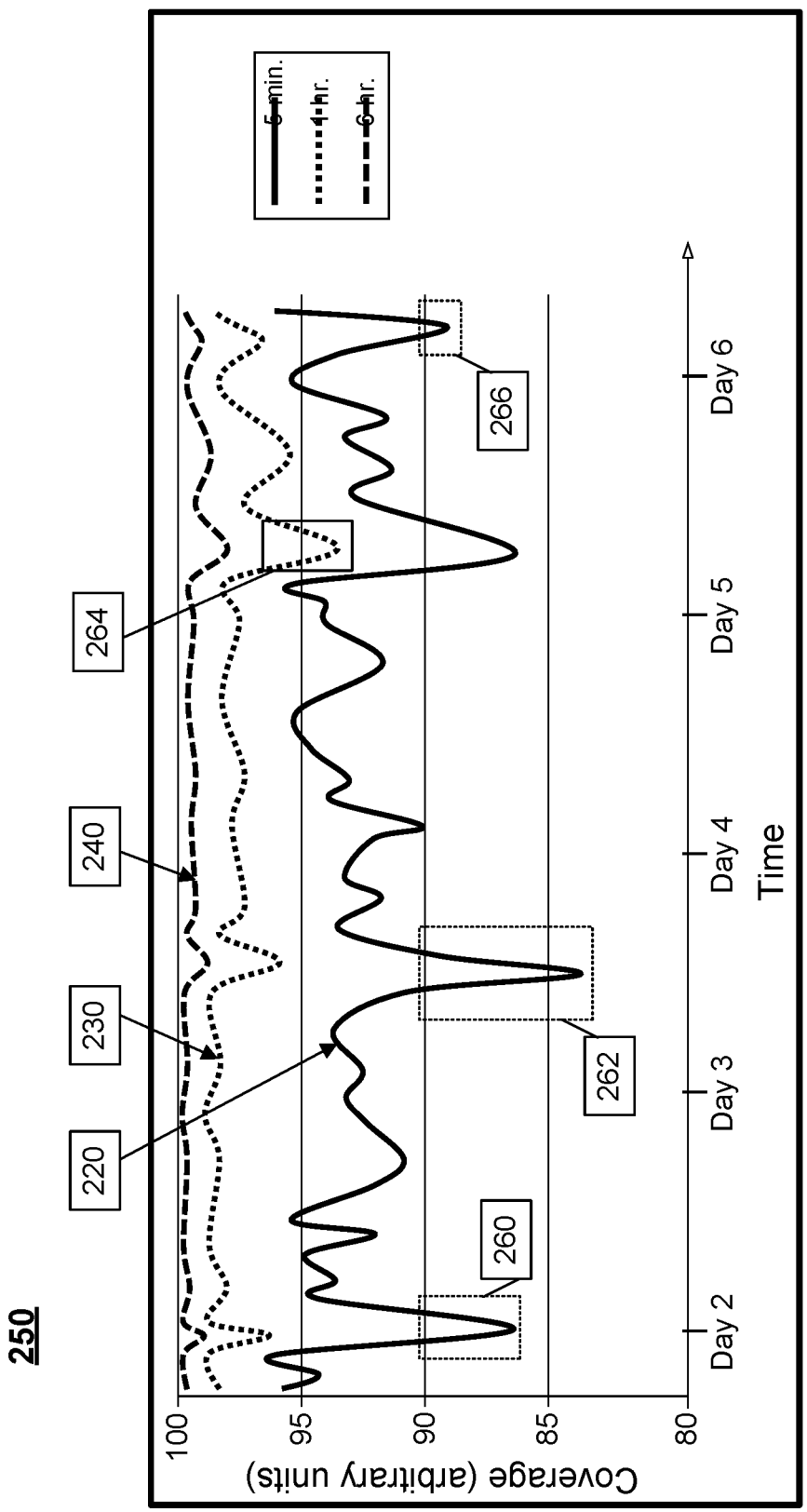

Turning to FIG. 2B, an example of a graph 250 that can be generated as a notification for measuring a processing system that receives a stream of requests in accordance with some embodiments is shown. In some embodiments, graph 250 can have an X-axis ("Time") identifying the start time (Day 2, Day 3, etc.) of the time window determined by process 100 at block 102, as discussed in connection with FIG. 1 above. In some embodiments, graph 200 can have a Y-axis ("Coverage (arbitrary units)") identifying the scale of coverage scores determined by process 100 at block 110, as discussed in connection with FIG. 1 above.

In some embodiments, process 100 can determine multiple coverage scores using multiple time windows at block 102 of process 100 and can use the multiple coverage scores to generate a notification similar to that shown in graph 250, comprising curves 220, 230, and 240.

In some embodiments, curve 220 ("5 min.") can be generated by using a 5 minute time window at block 102 of process 100. For example, curve 220 can indicate, for requests received at a particular time window, which fraction of those requests were successfully completed within 5 minutes of their upload timestamp. In some embodiments, curve 230 ("1 hr.") can be generated by using a 1 hour time window at block 102 of process 100. For example, curve 230 can indicate, for requests received at a particular time window, which fraction of those requests were successfully completed within 1 hour of their upload timestamp. In some embodiments, curve 240 ("6 hr.") can be generated by using a 6 hour time window at block 102 of process 100. For example, curve 240 can indicate, for requests received at a particular time window, which fraction of those requests were successfully completed within 6 hours of their upload timestamp. In some embodiments, curves 220, 230, and 240 can include coverage scores from any suitable number of iterations of process 100. Although three curves are shown in FIG. 2B, in some embodiments, graph 250 can have any suitable number of curves where each curve is generated by using a different duration of time window at block 102 of process 100.

In some embodiments, notifications for a user, as discussed in connection with block 112 of process 100 above, can include current and/or historical values of coverage scores, as seen at notification points 260, 262, 264, and 266. In some embodiments, notification point 260 can be identified at block 112 of process 100 based on a coverage score below a threshold (e.g., coverage of 90 in "5 min" curve 220) and can also include any suitable number and/or combination of prior coverage scores. For example, in some embodiments, process 100 can generate a notification based on a current coverage score below 90, and can include an average of any suitable number of coverage scores (e.g., 10 most recent coverage scores) in addition to the current coverage score. In some embodiments, process 100 can include a warning for system health based on coverage scores below any suitable threshold. For example, in some embodiments, process 100 can include a system health indicator in the notification at block 112 at notification point 264, where the coverage score on curve 230 ("1 hr.") is below 95.

Figure 3:
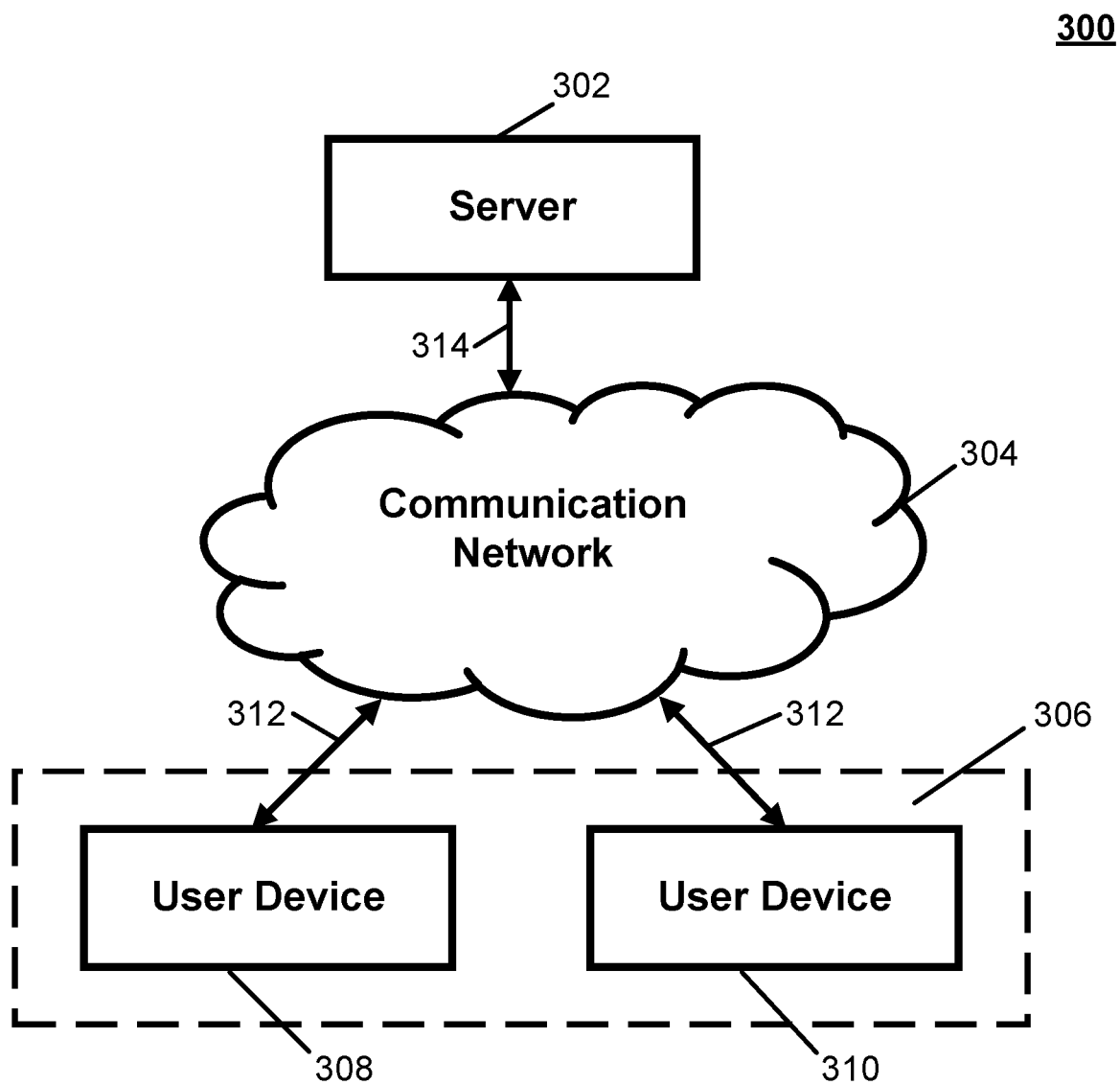
FIG. 3 shows an example of a schematic diagram of a system that could be used to implement the mechanisms described herein in accordance with some embodiments of the disclosed subject matter.
Figure 4:
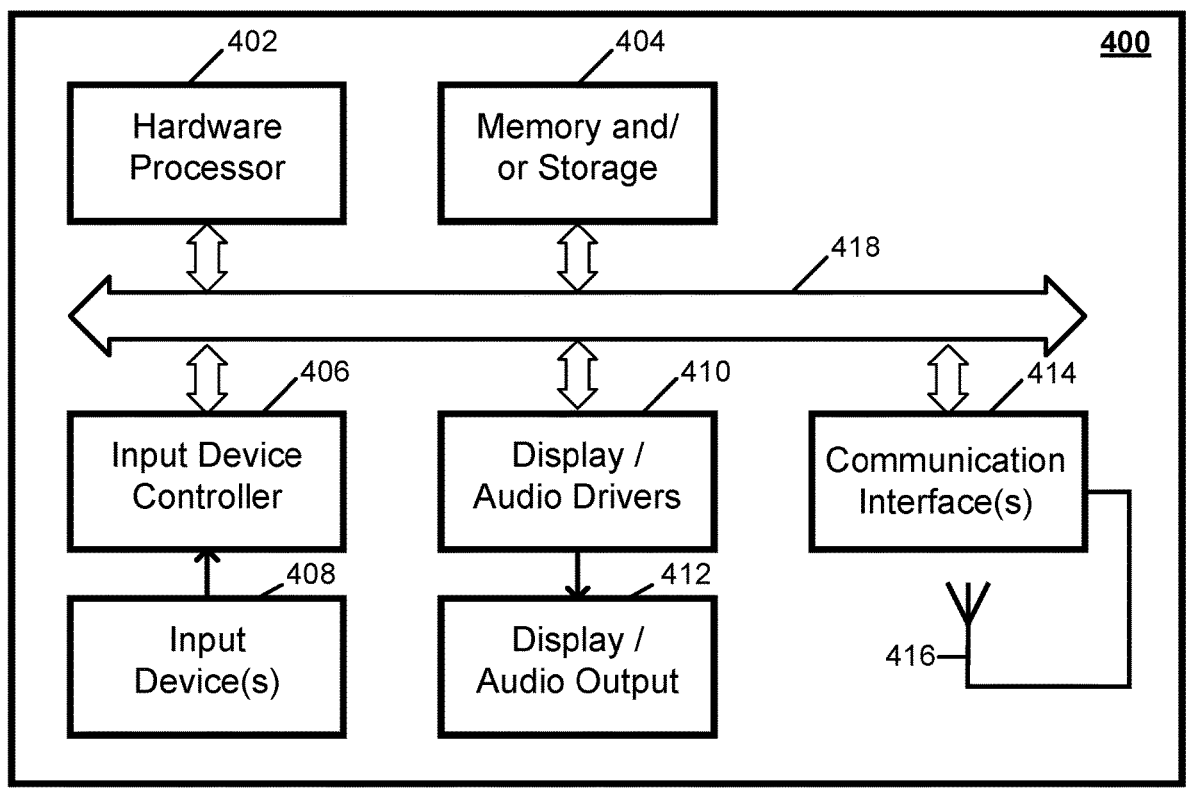
FIG. 4 shows an example of hardware that can be used in a server and/or a user device of FIG. 3 in accordance with some embodiments of the disclosed subject matter.

Turning to FIG. 3, an example 300 of hardware for determining a coverage score for a processing system that receives a stream of requests in accordance with some embodiments is shown. As illustrated, hardware 300 can include a server 302, a communication network 304, and/or one or more user devices 306, such as user devices 308 and 310.

Server 302 can be any suitable server(s) for storing information, data, programs, media content, and/or any other suitable content. In some embodiments, server 302 can perform any suitable function(s). For example, in some embodiments, server 302 can perform any suitable portion(s) of process 100 as described above in connection with FIG. 1.

Communication network 304 can be any suitable combination of one or more wired and/or wireless networks in some embodiments. For example, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links (e.g., communications links 312) to communication network 304 that can be linked via one or more communications links (e.g., communications links 314) to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices suitable for operation with process 100 (e.g., receiving a notification generated at block 112 of process 100). In some embodiments, user devices 306 can include any suitable type of user device, such as mobile phones, tablet computers, wearable computers, laptop computers, desktop computers, smart televisions, media players, game consoles, vehicle information and/or entertainment systems, and/or any other suitable type of user device.

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid overcomplicating the figure, any suitable number of user devices, (including only one user device) and/or any suitable types of user devices, can be used in some embodiments.

Server 302 and user devices 306 can be implemented using any suitable hardware in some embodiments. For example, in some embodiments, devices 302 and 306 can be implemented using any suitable general-purpose computer or special-purpose computer and can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 402 can be controlled by a computer program stored in memory and/or storage 404. For example, in some embodiments, the computer program can cause hardware processor 402 to perform functions described herein.

Memory and/or storage 404 can be any suitable memory and/or storage for storing programs, data, documents, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks, such as network 304 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for determining system reliability, the method comprising:
   for a processing system that receives a stream of requests, determining, using a hardware processor, a first time window in which requests are received by the processing system, wherein the first time window has a start time and an end time and wherein each of the requests is associated with a timestamp;
   determining, using the hardware processor, a first number of requests that entered the processing system after the start time of the first time window;
   determining, using the hardware processor, a second number of requests that entered the processing system within the first time window and that were successfully completed within a second time window from the timestamp associated with each of the requests;
   determining, using the hardware processor, a coverage score that is a ratio of the second number of requests in comparison with the first number of requests; and
   generating, using the hardware processor, a notification for a user of the processing system based on the coverage score.

2. The method of claim 1, further comprising determining a category of requests within the processing system, wherein the requests in the first number of requests are within the category of requests that entered the processing system after the start time of the first time window and wherein the requests in the second number of requests are within the category of requests that entered the processing system within the first time window and that were successfully completed within the second time window from the timestamp.

3. The method of claim 1, wherein the processing system comprises monitoring video content for compliance with a content policy.

4. The method of claim 1, wherein the stream of requests comprises at least one request to detect features within video content.

5. The method of claim 1, wherein the stream of requests comprises at least one request to generate classification labels for video content.

6. The method of claim 1, wherein generating the notification for the user of the processing system based on the coverage score comprises:
   determining a threshold with at least one of a lower bound and an upper bound;
   determining that the coverage score is outside of the threshold; and
   generating a message comprising at least one of the coverage score and the threshold.

7. The method of claim 1, wherein the notification includes a previously determined coverage score.

8. A system for determining system reliability, the system comprising:
   a memory; and
   a hardware processor that is coupled to the memory and that is configured to:
   for a processing system that receives a stream of requests, determine a first time window in which requests are received by the processing system, wherein the first time window has a start time and an end time and wherein each of the requests is associated with a timestamp;

determine a first number of requests that entered the processing system after the start time of the first time window;

determine a second number of requests that entered the processing system within the first time window and that were successfully completed within a second time window from the timestamp associated with each of the requests;

determine a coverage score that is a ratio of the second number of requests in comparison with the first number of requests; and generate a notification for a user of the processing system based on the coverage score.

9. The system of claim 8, wherein the hardware processor is further configured to determine a category of requests within the processing system, wherein the requests in the first number of requests are within the category of requests that entered the processing system after the start time of the first time window and wherein the requests in the second number of requests are within the category of requests that entered the processing system within the first time window and that were successfully completed within the second time window from the timestamp.

10. The system of claim 8, wherein the processing system comprises monitoring video content for compliance with a content policy.

11. The system of claim 8, wherein the stream of requests comprises at least one request to detect features within video content.

12. The system of claim 8, wherein the stream of requests comprises at least one request to generate classification labels for video content.

13. The system of claim 8, wherein generating the notification for the user of the processing system based on the coverage score comprises:

determining a threshold with at least one of a lower bound and an upper bound;

determining that the coverage score is outside of the threshold; and generating a message comprising at least one of the coverage score and the threshold.

14. The system of claim 8, wherein the notification includes a previously determined coverage score.

15. A non-transitory computer-readable medium containing computer executable instructions that, when executed by a processor, cause the processor to execute a method for determining system reliability, the method comprising:

for a processing system that receives a stream of requests, determining a first time window in which requests are received by the processing system, wherein the first time window has a start time and an end time and wherein each of the requests is associated with a timestamp;

determining a first number of requests that entered the processing system after the start time of the first time window;

determining a second number of requests that entered the processing system within the first time window and that were successfully completed within a second time window from the timestamp associated with each of the requests;

determining a coverage score that is a ratio of the second number of requests in comparison with the first number of requests; and generating a notification for a user of the processing system based on the coverage score.

16. The non-transitory computer-readable medium of claim 15, wherein the method further comprises determining a category of requests within the processing system, wherein the requests in the first number of requests are within the category of requests that entered the processing system after the start time of the first time window and wherein the requests in the second number of requests are within the category of requests that entered the processing system within the first time window and that were successfully completed within the second time window from the timestamp.

17. The non-transitory computer-readable medium of claim 15, wherein the processing system comprises monitoring video content for compliance with a content policy.

18. The non-transitory computer-readable medium of claim 15, wherein the stream of requests comprises at least one request to detect features within video content.

19. The non-transitory computer-readable medium of claim 15, wherein the stream of requests comprises at least one request to generate classification labels for video content.

20. The non-transitory computer-readable medium of claim 15, wherein generating the notification for the user of the processing system based on the coverage score comprises:

determining a threshold with at least one of a lower bound and an upper bound;

determining that the coverage score is outside of the threshold; and generating a message comprising at least one of the coverage score and the threshold.

21. The non-transitory computer-readable medium of claim 15, wherein the notification includes a previously determined coverage score.

* * * * *